United States Patent [19]
Garrett

[11] 3,876,972
[45] Apr. 8, 1975

[54] KELLY
[75] Inventor: William R. Garrett, Midland, Tex.
[73] Assignee: Smith International Inc., Houston, Tex.
[22] Filed: Dec. 26, 1973
[21] Appl. No.: 427,442

Related U.S. Application Data
[63] Continuation of Ser. No. 264,067, June 19, 1972, abandoned.

[52] U.S. Cl............ 340/18 LD; 340/18 NC; 175/27; 175/50; 73/136 A; 73/136 B
[51] Int. Cl............................................... G01v 1/40
[58] Field of Search ..... 340/18 LD, 18 NC; 175/27, 175/50; 73/136 A, 136 B

[56] References Cited
UNITED STATES PATENTS

| | | | |
|---|---|---|---|
| 1,979,481 | 11/1934 | Lynch et al. | 340/18 NC |
| 2,858,108 | 10/1958 | Wise et al. | 175/105 |
| 3,170,137 | 2/1965 | Brandt | 340/18 LD |
| 3,588,804 | 6/1971 | Fort | 340/18 LD |
| 3,664,184 | 5/1972 | Dyer | 73/136 A |
| 3,696,332 | 10/1972 | Dickson et al. | 340/18 LD |

*Primary Examiner*—Maynard R. Wilbur
*Assistant Examiner*—N. Moskowitz
*Attorney, Agent, or Firm*—Murray Robinson

[57] ABSTRACT

A kelly useful in the rotary system of drilling comprises a tubular member having threaded box connection means at each end for making connection with other fluid conducting members to transmit fluid and mechanical stress therebetween, surface configuration means at the exterior of the kelly adapted for making an axially slidable torque transmitting connection with a rotary table, said configuration means extending between said connection means, transducer means in one of said connection means for producing electric signals that are a function of a drill string parameter to which the transducer means is responsive, e.g. torque and/or tension, electrical connection means connected to said transducer means and extending therefrom inside the kelly within a productive tube to the other connection means at the other end of the kelly and thence out through a hole in the side of said other connection means, a housing around said other connection means, radio transmitter means in said housing connected to said electrical connection means and responsive to electrical signals transmitted by said electrical connection means from said transducer, and a loop antenna connected to said radio transmitter means and carried coaxially by said housing in a band of insulation therein, said transmitter being powered by battery means also located in said housing.

Signals from the transmitter are received by a receiver located, e.g., on a leg of the drill rig, receiver being connected to suitable display means of the indicator and/or recording type whereby drilling torque and/or weight, or other drill string parameters can be continuously measured, indicated, and recorded versus time.

7 Claims, 6 Drawing Figures

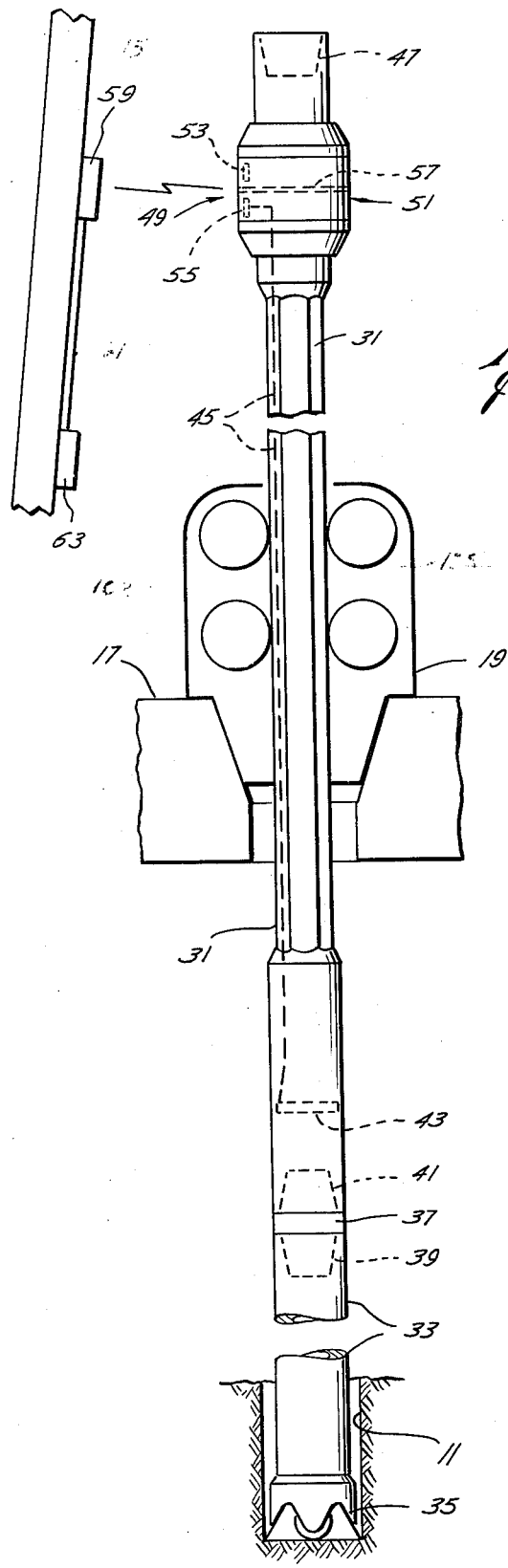
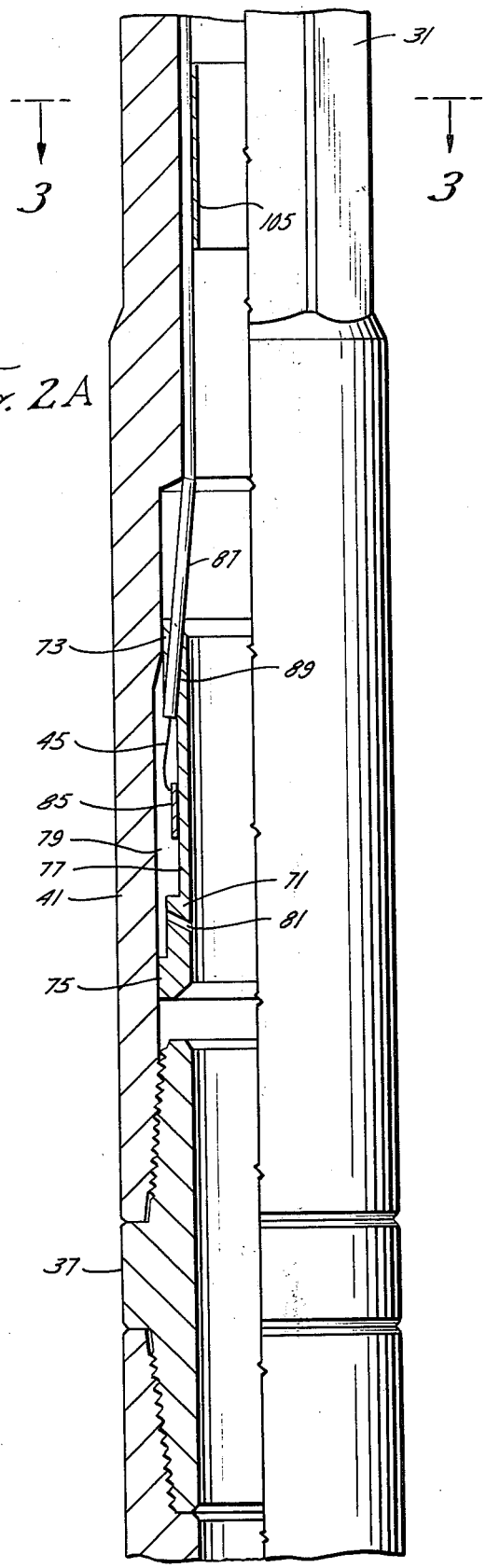

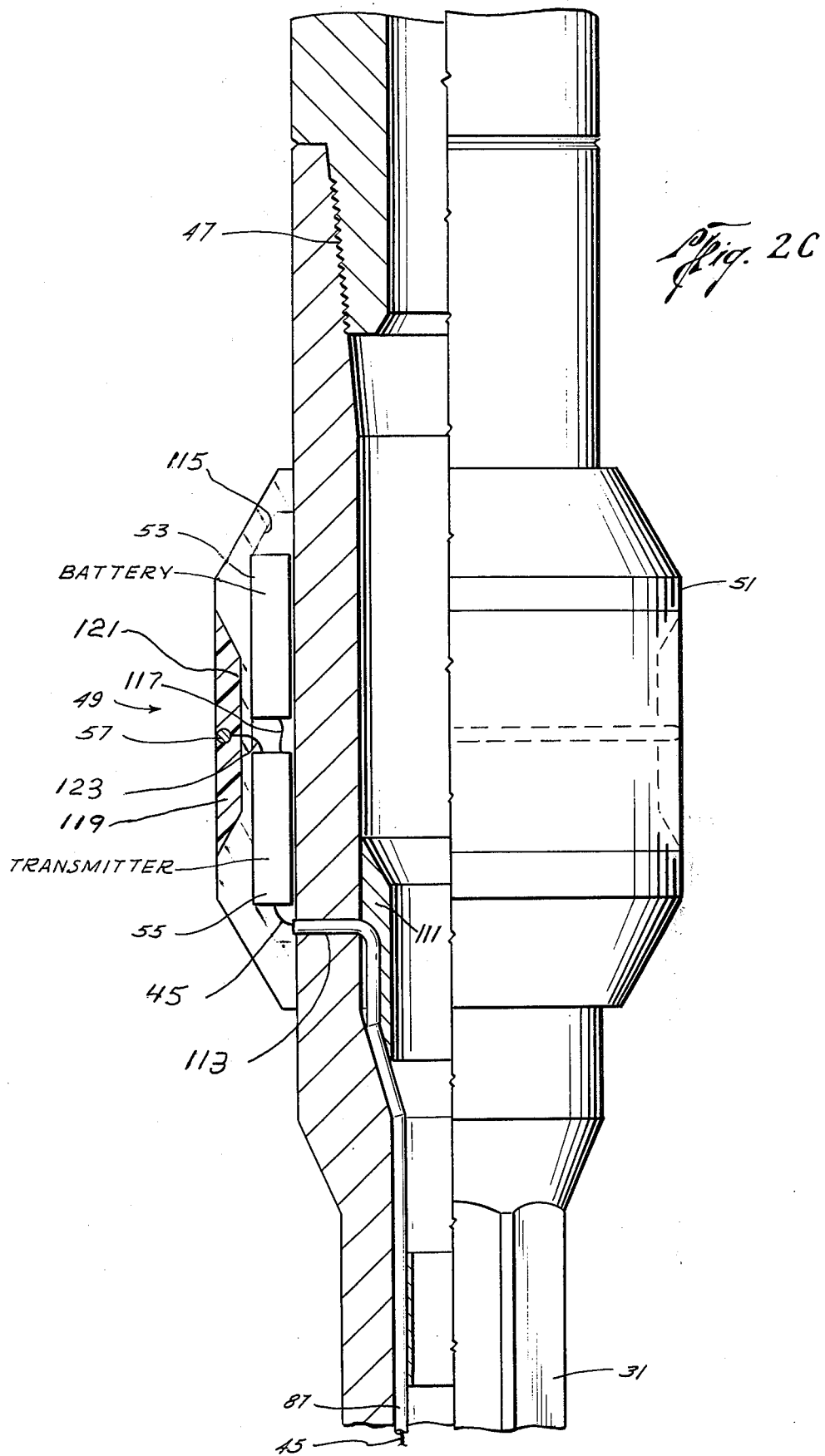

This is a continuation of application Ser. No. 264,067, filed June 19, 1972, now abandoned.

BACKGROUND OF THE INVENTION

1. Field of the Invention

This invention pertains to earth boring and more particularly to apparatus for indicating the torque in a drill spring used in the rotary system of drilling petroleum wells.

2. Description of The Prior Art

The torque in a drill string exists in the part of the drill string below the rotary table. Therefore there is a problem of acess both as regards measuring the torque and transmitting information regarding the measurement to the driller. Although it would be best to measure the torque immediately adjacent to the drill bit, transmission of information regarding such measurement through the drill string is difficult. Examples of efforts to transmit information of various sorts through a drill string are to be found in U.S. Pat. Nos.:

3,170,137 - Brandt; 3,253,245 - Brandt; which disclose the transmission of direct and low frequency alternating current via conductors inside the drill pipe and U.S. Pat. No.

2,492,794 - Globe et al which describes the use of radio frequency electric current transmitted by the drill string itself to convey information relative to conditions at the lower end of the drill string.

Other systems of communication between the surface and the bottom of a hole are shown in U.S. Pat. Nos.

2,957,159 - Fitchette; 3,252,225 - Hixson; 3,588,804 - Fort

Fitchette describes the use of a radio transmitter adjacent a drill bit to transmit radio waves to the surface where they are picked up by a receiver. Fitchette says that the receiver "antenna may be a short length of wire positioned at the upper portion of the tubing string" and covered by insulation or the "antenna may be positioned at the surface a short distance from the top of the hole." There is no indication of how the receiving antenna at the top of the string is to be mounted relative to the rotating tubing string.

The Fort patent relates to the use of ultrasonics for transmitting information through a drill pipe from the bottom to the surface, detecting the waves at the surface, and transmitting the detected signal from the drill string to a recording device. It appears that the shear waves are converted to radio signals which are transmitted from an antenna mounted at the detector to a radio receiver located nearby where the signals are recorded.

The Hixon patent shows a surface to bottom communication system including the use of sonic signals for conveying information along the drill pipe from bottom to the top and a sonic signal detector "secured to the kelly or drill pipe to pick up the signal and send it through an amplifier to an indicator." No details are given as to the method of transferring the signal from the detector to the amplifier.

United States Pat. No.

2,000,716 - Polk discloses a surface to bottom communiation system using electrical conduction through the pipes of the drill string. The electric current signal is removed from the rotating drill string at the upper end thereof by means of a slip ring just above the kelly. The rotating contact of the slip ring has the well known objectives, including the possibility of sparking.

An arranagement similar to that of Polk is shown in United States Pat. No.

2,096,359 - Hawthorn employing a collector ring and brush at the kelly joint. The electric signal is conducted along the drill string in a wire housed in a tube brazed to the interior of the drill pipe. The collector ring and brush assemblly at the kelly joint is not shown, but is objectionable the same as for the like construction of Roth.

A number of U.S. Pat. Nos. disclose electrical conduits and connections useful in connection with pipes, for example 749,633 - W. G. Seeley; 2,178,931 - W. J. Crites et al.; 2,301,783 - R. E. Lee; 2,531,120 - H. L. Feaster; 2,694,800 - K. R. Sunderhauf; 2,706,616 - D. W. Osmum; 2,748,358 - D. S. Johnston; 2,750,569 - J. Moon; 2,906,502 - E. W. Smith; 3,253,245 - H. Brandt; 3,518,609 - J. E.. Fontenot, Jr.

but these patents do not teach methods of transferring signals from a rotating pipe to adjacent stationary recording means.

If a measurement of pipe stress is made in the above ground part of a well pipe string in the top most joint of pipe, there is less difficulty. The measuring equipment need not be restricted to well bore dimensions nor need it be subjected to the ambient conditions either inside the drill string or in the well bore itself. Examples of measuring apparatus of this type are shown in the U.S. Pat. Nos.

3,376,921 - Manry et al; 3,457,781 - Elliott which illustrates the use of strain gages to measure the tension in well pipes. In the Elliott construction, strain gages measure the tension in the polish rod of a pumping well at a level above the wellhead stuffing box seal through which the rod reciprocates. Manry et al disclose the use of strain gages in production pipe strings being reciprocated in a well bore during cementing, the gages being located in the pipe string above the rotary table. In both of the latter two constructions the strain gage output is fed to a Wheatstone bridge whose output is indicated or recorded by a galvanometer.

The precise problem of torque measurement in a rotary drilling system has been considered in U.S. Pat. No.

3,295,367 - Rundell which diclose that torque can be measured by the phase displacement between two alternators having rotors driven by parts of a shaft connecting the engine to the rotary table. Such construction requires the use of a special shaft connection means and does not measure directly the drill string torque.

The disclosure of the aforementioned Gobel et al., Fitchette, Hixon, Fort, Manry, and Ellliott prior art patents are incorporated herein by reference to show the details of various well known components.

SUMMARY OF THE INVENTION

According to the present invention there is provided drill string torque measuring apparatus including a special kelly including strain gage means at its lower end (below the rotary table) for measuring torque, electric conductor means inside the kelly for transmitting information regarding the torque measurement to the upper end of the kelly (above the rotary table), and radio transmission means at the upper end of the kelly for broadcasting the information to a radio receiver with indicating or recording means or both located conveniently to the driller.

The radio transmission means includes a radio frequency generator preferably a short wave generator in the ultra-high frequency television or frequency modulation radio broadcast range. The signal from the generator is conducted through the kelly wall to a loop antenna encircling the kelly to transmit effectively to the radio receiving apparatus in all positions of rotation of the kelly. By this means, mechanical means such as slip rings, for transmitting the information from the kelly to the driller is eliminated. No modification of the rotary table or the drive therefor is required. No electrical connections between drill string joints are needed.

The kelly has a box at its lower end in which the strain gage means is located shielded from the drilling fluid. The electric conductor means comprises a cable clamped to the inner periphery of the kelly so as to avoid weakening the external drive surfaces of the kelly. The cable extends out through hole in a box at the upper end of the kelly to the radio transmitter means. The latter is disposed in a housing secured around the box and includes a power supply, a short wave generator, and a loop antenna surrounding the box so as to transmit effectively to the radio receiver in all positions of rotation of the kelly.

BRIEF DESCRIPTION OF THE DRAWINGS

For a detailed description of a preferred embodiment of the invention, reference will now be made to the accompanying drawings wherein FIG. 1 is a schematic view showing a rotary drilling system employing the present invention;

FIG. 2A is a half sectional view of the lower part of a kelly in accordance with the invention;

FIG. 2C is a half section of the upper part of said kelly;

DESCRIPTION OF PREFERRED EMBODIMENT

Figure 2B:
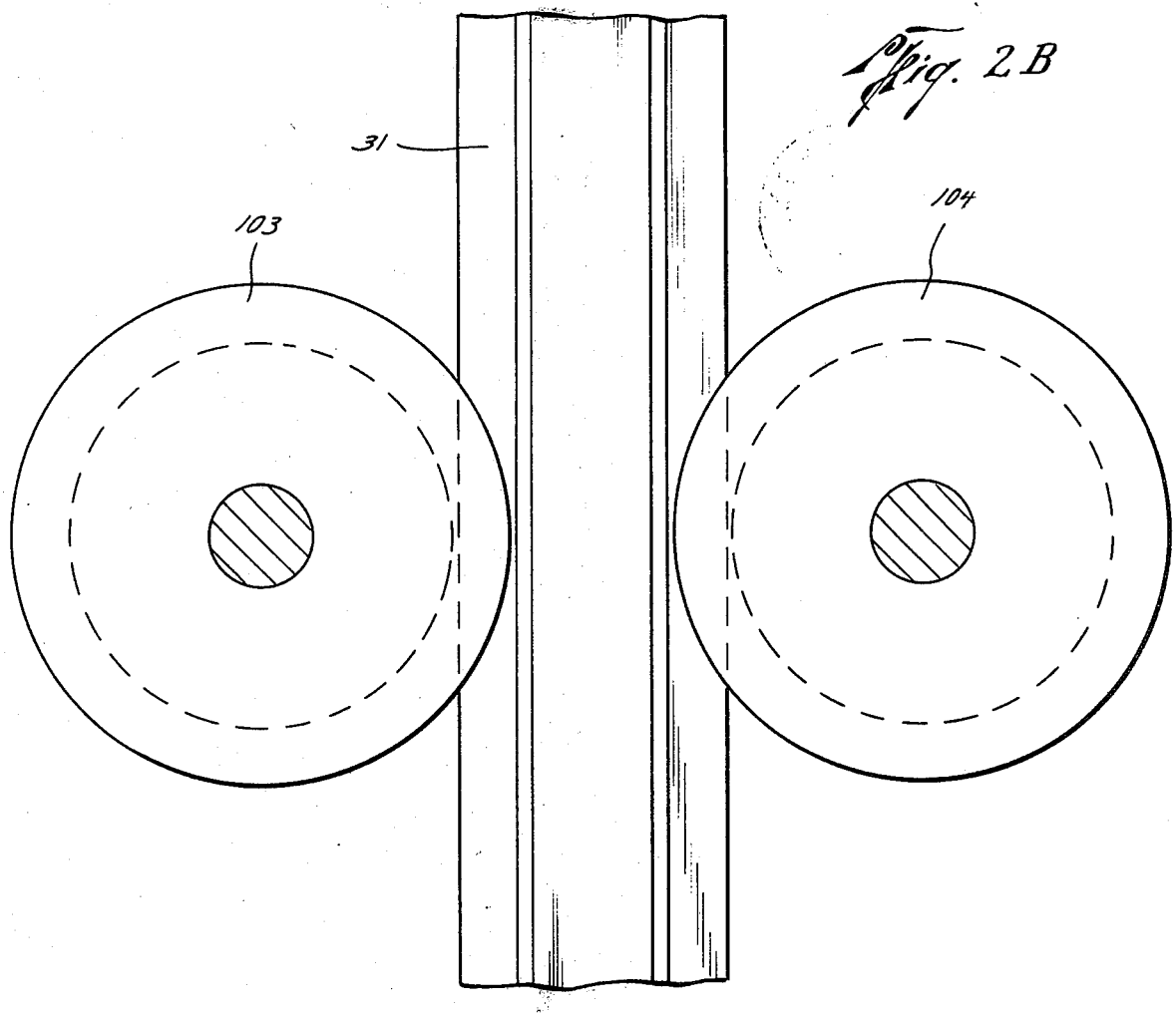
FIG. 2B is an elevation of a mid-portion of said kelly showing its relationship to the kelly driving means.

Referring now to FIG. 1 there is shown a well bore 11, a drill rig including a derrick for raising and lowering a drill string, the derrick having legs 15, and drive means for rotating the drill string including a rotary table 17 within which is disposed a roller kelly bushing 19. Suspended by the derrick from a cable and blocks and swivel (not shown) is a drill string comprising a kelly 31, a plurality of joints of drill pipe 33, and a drill bit 35.

A double pin sub 37 connects the box 39 at the upper end of the uppermost joint of drill pipe to the box 41 at the lower end of the kelly 31.

Within box 41 is disposed strain gage means 43 whose output is connected to cable 45 extending upwardly by inside kelly 31. The cable extends out through a hole in the box 47 at the upper end of the kelly, to a radio transmitter means 49 disposed in a housing 51 secured around the box 47. The radio transmitter means includes a battery power supply 53, a short wave electric generator 55, and a loop antenna 57 extending around the exterior of housing 51 but insulated therefrom.

Signals from radio transmitting means 49 are broadcast to radio receiver means 59 affixed to a leg of the derrick at a level about midway of the range of elevation of the radio transmitting means 49 as it moves down during drilling. The output of radio receiving means 59 is fed by cable 61 to display means 63 convenient to the driller. The display means may take any convenient form to give an instantaneous indication or a record plotted against time.

The strain gage means measures the torque in the drill string below the point of drive by the rotary table through the kelly bushing and creates an electric signal as a measure thereof. For example, the strain gage means may include a Wheatstone bridge as disclosed in the aforementioned prior art patents, the disclosures of which are herein incorporated by reference. The output of the strain gage means is conducted by electric cable 45 to the radio transmitter means whose output is thereby modulated as a function of the output of the strain gage means. For example, the short wave generator 55 may be frequency modulated proportional to the output of strain gage means 43. The display means 63 near the rig floor will produce an indication of drill string torque or a record of drill string torque versus time.

If desired the strain gage means may include also means to measure drill string tension to be indicated and recorded by display means 63. Display means 63 may be of any known form, for example a galvanometer indicator or a galvanometer pen moving over a clock driven paper chart, as described in the aforementioned prior art patents.

Referring now to FIG. 2A there is shown double pin sub 37 and lower box 41 of kelly 31. Within the box is disposed a sleeve 71 which is secured in place by an interference fit, e.g. a shrink fit at its upper end 73 and at the flange 75 at its lower end. The mid portion 77 of the sleeve is thinner than the remainder of the sleeve so that most of the strain in the sleeve is concentrated in this mid portion.

The sleeve 71 and adjacent box form a chamber 79 shielded from the flow of drilling fluid through the kelly but maintained at the same pressure as the drilling fluid by equalizer port 81. Within chamber 79 is disposed the strain gage means 43 which includes one or more strain gages, such as 85, and, if desired, resistance elements of a Wheatstone bridge. The strain gages are connected to the mid portion 77 of the sleeve 71 in conventional fashion. The output of the strain gage means is connected to cable 45 which extends into protecting metal tube 87. Tube 87 leaves chamber 79 through a passage 89 in the upper end of sleeve 71, preferably being threaded therein.

Figure 3:
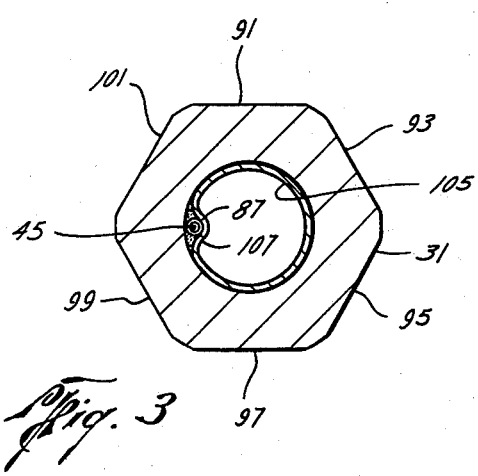
FIG. 3 is a section taken at plane 3—3 of FIG. 2A, but drawn to a larger scale.

Tube 87, with cable 45 therein, extends up through box 41 into the drive portion of kelly 31. Referring now also to FIGS. 2B and 3 the drive portion of the kelly includes a plurality, e.g. six, flat sides 91, 93, 95, 97, 99, 101, by which the drive rollers, e.g. 103, 104 of the kelly bushing impart torque thereto to rotate the drill string. Although tube 87 and cable 45 coould be disposed in an external groove in one of the flat sides of the drive portion of the kelly, it is preferable to locate them inside the kelly as shown. Welds or threaded fastening means to secure the tube to the kelly in an external groove would be undersirable as tending to weaken the kelly, and the tube itself might leak in case of a threatened blowout requiring closure on the drill string.

The tube 87 is maintained at one side of the kelly against the inner periphery thereof by a plurality of positioning sleeves 105 fitting closely within the kelly, each being provided with an indentation 107 extending the length thereof within which is disposed tube 87. The tube 87 is welded in place in indentation 107. The plurality of positioning sleeves are spaced apart axially along the length of the kelly by means of the tube 87.

Figure 4:
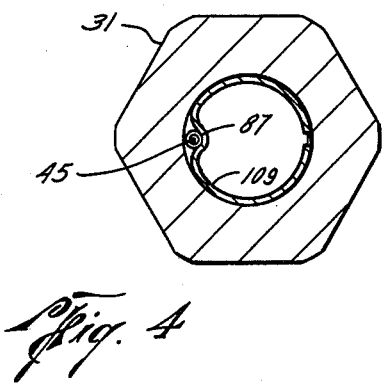
FIG. 4 is a view similar to FIG. 3 showing a modification.

Instead of using positioning sleeves welded to the tube 87, the tube could be positioned by longitudinally split tubular spring clamps 109 as shown in FIG. 4, the clamps providing positioning means spaced apart axially along the length of the kelly the same as sleeves 105.

Referring again to FIG. 3, the cable 45 includes a plurality of electrical conductors electrically insulated from each other and from the exterior of the cable. The metal tube 87 provides mechanical protection for the cable, shielding it from the flow of drilling fluid inside the kelly.

Referring now to FIG. 2C there is shown the upper end of the kelly 31, the tube 87 and cable 45 continuing up therein to the lower part of box 47. The tube and cable are held to one side of the box 47 by guide sleeve 111 pressed into the box or in other manner secured therein. The tube and cable exit the box through a hole 113 in the side of the box, the tube terminating at the outer end of the hole and being sealed to the box where it passes through the hole. The cable 45 leaves tube 87 and enters annular cavity 115 inside housing 51 where it is connected to radio transmitter 55. The housing 51, which is annular is suitably secured to box 47, at such a level that cavity 115 is adjacent the hole 113 to admit wire 45 into the cavity.

Transmitter 57 is connected to replaceable electric battery power supply means 53 by cable 117. The transmitter and power supply are suitably removably secured to the inner periphery of the annular housing 51, e.g. by snap rings similar to ring 109 shown in FIG. 4, so that they can easily be replaced when necesary. In the course of such replacement the housing 51 is first removed, and to facilitate such removal it may be split diametrically and the two halves held together by bolts or screws (not shown) by which means the housing is clamped to the box 47. Or the housing can be split horizontally into an upper and lower part, the parts being held together by screws or bolts and one part, e.g. the lower part, or the upper part shrink fitted to the box 47, the other part being readily slidable on the box for removal and replacement when desired.

Transmitting loop antenna 57 is buried in insulation 119 extending around the outer periphery of housing 51 in annular groove 121 therein. This protects the antenna from moisture and abrasion. Antenna 57 is connected to transmitter 55 by cable 123.

While a preferred embodiment of the invention has been shown and described it is apparent that may modifications thereof can be made by one skilled in the art without departing from the spirit of the invention.

I claim:

1. In a kelly adapted to form part of a drill string useful in the rotary system of drilling, said kelly comprising a one-piece tubular member adapted to extend through a rotary table and kelly bushing from the underside thereof to the upper side thereof to transmit fluid and mechanical stress between above and below the rotary table and kelly bushing, said tubular member having upper connection means at one end for making connection with fluid connecting and mechanical stress transmitting means above the rotary table and kelly bushing and lower connection means at the other end for making connection with fluid conducting and mechanical stress transmitting drill pipe means below the rotary table and kelly bushing and non-circular surface configuration means at the exterior of the tubular member adapted for making an axially slidable torque transmitting connection with a kelly bushing in a rotary table, said configuration means extending between said connection means, the improvement adapting said kelly to performance of the additional function of torque measurement in the drill string at a level below the rotary table and kelly bushing comprising transducer means in said lower connection means for producing torque indicating electric signals that are a function of torque about the axis of said tubular member in the portion thereof below the rotary table and kelly bushing, torque signal transmission means adapted to convey said torque indicating signals from said transducer means in said lower connection, that is to be positioned below said rotary table and kelly bushing, and thence interiorly of said surface configuration means, that is to be positioned extending through the rotary table and kelly bushing, to said upper connection means, that is to be positioned above said rotary table and kelly bushing, said torque signal transmission means comprising electrically conductive wire connected to said transducer means and extending therefrom inside the kelly to the upper connection means at the other end of the kelly, and radio transmitter means connected to said wire at said upper connection means of the kelly and responsive to said torque indicating signals to transmit radio signals that are a function of torque about the axis of said tubular member at the level of said lower connection means that is to be positioned below the rotary table and kelly bushing.

2. A kelly according to claim 1 including a protective metal tube extending inside the inner periphery of said tubular member from adjacent said transducer to adjacent said radio transmission means, said electrically conductive wire being disposed in said tube.

3. A kelly according to claim 2, said kelly having a box at each end, said tube extending from one box to the other, said transducer being disposed in one box and said radio transmission means being disposed adjacent the other box.

4. A kelly according to claim 3, said radio transmission means being disposed around the outside of said other box, said tube connecting to a hole in said other box through which said electrical connection means extends.

5. A kelly according to claim 6 including ring means inside said tubular member positioning said tube against the inner periphery of said tubular member.

6. A kelly according to claim 5 wherein said ring means are fastened to said tube at axially spaced locations.

7. A kelly according to claim 5 wherein said rings are split snap rings.

\* \* \* \* \*

UNITED STATES PATENT AND TRADEMARK OFFICE
CERTIFICATE OF CORRECTION

PATENT NO. : 3,876,972
DATED : April 8, 1975
INVENTOR(S) : William R. Garrett

It is certified that error appears in the above-identified patent and that said Letters Patent are hereby corrected as shown below:

Column 6, line 6, cancel "connecting" and substitute "conducting".
Column 6, line 60, cancel "6" and substitute "4".

Signed and Sealed this thirteenth Day of April 1976

[SEAL]

Attest:

RUTH C. MASON
Attesting Officer

C. MARSHALL DANN
Commissioner of Patents and Trademarks